July 22, 1924.
O. A. EKLUND
LOCKING DEVICE
Filed July 6, 1923
1,502,555
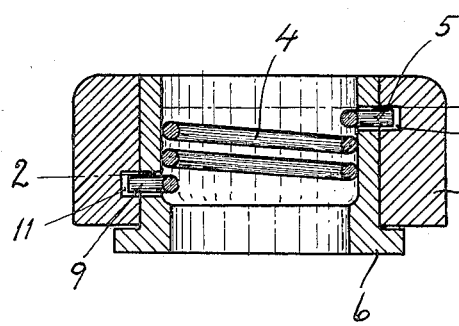
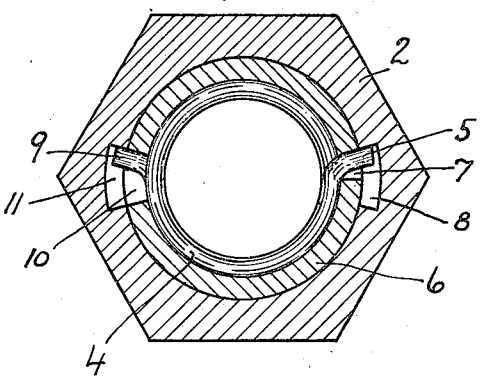
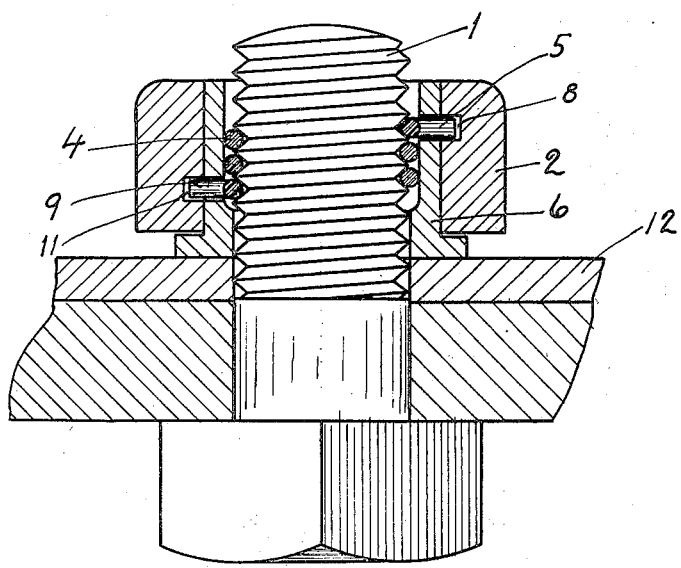
Inventor
Oskar Arvid Eklund Patented July 22, 1924.

1,502,555

UNITED STATES PATENT OFFICE.

OSKAR ARVID EKLUND, OF STOCKHOLM, SWEDEN.

LOCKING DEVICE.

Application filed July 6, 1923. Serial No. 649,971.

*To all whom it may concern:*

Be it known that I, OSKAR ARVID EKLUND, a subject of the King of Sweden, residing at Hantverkaregatan 31 D, in the city of Stockholm and Kingdom of Sweden, have invented certain new and useful Improvements in Locking Devices, of which the following is a specification.

My invention consists in the construction and novel combination and arrangement of the parts hereinafter fully described, illustrated in the accompanying drawings and pointed out in the claim hereunto appended.

In the drawing—

Fig. 1 is a longitudinal central sectional view of the locking device.

Fig. 2 is a transverse sectional view taken on line 2—2 in Fig. 1.

Fig. 3 shows the locking device mounted on a screw.

Referring now to these figures, 1 represents a screw and 2 a nut in which a spiral spring 4 is mounted engaging the threads of the screw 1. If desired the cross-section of the spring may be triangular in shape. One end 5 of the spring 4 extends through a hole 7 in a sleeve 6 mounted in the nut 2 and projects into a slot 8 in said nut. The other end 9 of the spring 4 extends through a slot 10 in the sleeve 6 and projects into a slot 11 in the nut 2.

In screwing the nut 2 clockwise in Fig. 2 the rear end of the slot 8 will engage the end 5 of the spring 4 and thereby open the coils thereof sufficiently to allow for the moving of the spring on the screw in the continued turning of the nut in said direction. Finally, the sleeve 6, which is moved together with the spring due to the cooperation of the aperture 7 and the end 5 of the spring will engage the element 12. The screw is now locked in proper position by the spring and sleeve as the latter cannot perform any movement that would cause a turning of the spring on the screw in such a direction (counter-clockwise in Fig. 2) that the screw is untightened. This depends upon the fact that any turning of the sleeve in said direction due to the cooperation of the aperture 7 and the end 5 of the spring will press the coils of the spring into the threads of the screw. It is obvious that no turning of the spring on the screw and consequently no untightening of the latter can be effected by such actuation of the spring.

When it is desired to untighten the screw this may be done by simply turning the nut 2 counter-clockwise in Fig. 2. The spring will then be opened due to the pressure on the end 9 of the spring as exerted by the rear end of the slot 11.

It is obvious that my invention as shown and described is susceptible of various slight modifications and changes without departing from the spirit thereof, and as permitted under the terms of the following claim:

I claim:

A locking device comprising a nut, a spiral spring engaging the threads of a screw, and a sleeve mounted in the nut, one end of the spring extending through a hole in the sleeve and projecting into a slot in the nut the other end of the spring extending through a slot in the sleeve and projecting into a slot in the nut.

In testimony whereof I affix my signature.

OSKAR ARVID EKLUND.